United States Patent [19]
Jackson

[11] Patent Number: 5,368,171
[45] Date of Patent: Nov. 29, 1994

[54] DENSE FLUID MICROWAVE CENTRIFUGE

[76] Inventor: David P. Jackson, 608 Ruberta, Glendale, Calif. 91201

[21] Appl. No.: 915,140

[22] Filed: Jul. 20, 1992

[51] Int. Cl.$^5$ .............................. B08B 3/08; B08B 3/10
[52] U.S. Cl. .......................................... 134/147; 134/1; 204/157.15; 210/167; 210/361
[58] Field of Search ............... 134/1, 147; 204/157.15, 204/157.43; 210/748, 360.1, 361, 364, 365, 380.1, 380.2, 380.3, 167

[56] References Cited

U.S. PATENT DOCUMENTS

| | | | |
|---|---|---|---|
| 2,437,968 | 3/1948 | Palotsee | 134/147 |
| 2,845,045 | 7/1958 | Weiskopf | 134/147 |
| 5,068,040 | 11/1991 | Jackson | 210/748 |
| 5,215,592 | 6/1993 | Jackson | 210/748 |

*Primary Examiner*—Neil McCarthy
*Attorney, Agent, or Firm*—Roger A. Marrs

[57] ABSTRACT

An apparatus for cleaning substrates used in critical environments with stringent end-product cleanliness requirements in a single process using microwave-energized and centrifuged dense fluids. One or more dense fluids are mixed with one or more chemical or physical agents and are simultaneously subjected to microwave radiation and centrifugal force to remove deeply recessed contaminants from internal and external surfaces of intricately arranged or formulated substrates such as biomaterials, spent activated carbon, elastomerics, surgical aids, or dental implants. Subsequently, cleaned substrates are simultaneously subjected to microwave radiation and centrifugal force under vacuum to remove residual volatile contaminants. Additionally, the cleaned and sterilized substrates are contacted with chemical or physical agents to provide enhanced cleaning and to provide new and improved substrate properties such as increased electrical insulation, conductivity, or biocompatibility. Finally, substrates which are prepackaged in semi-permeable membranes are cleaned using this apparatus, thus preventing recontamination of the cleaned substrates.

12 Claims, 3 Drawing Sheets

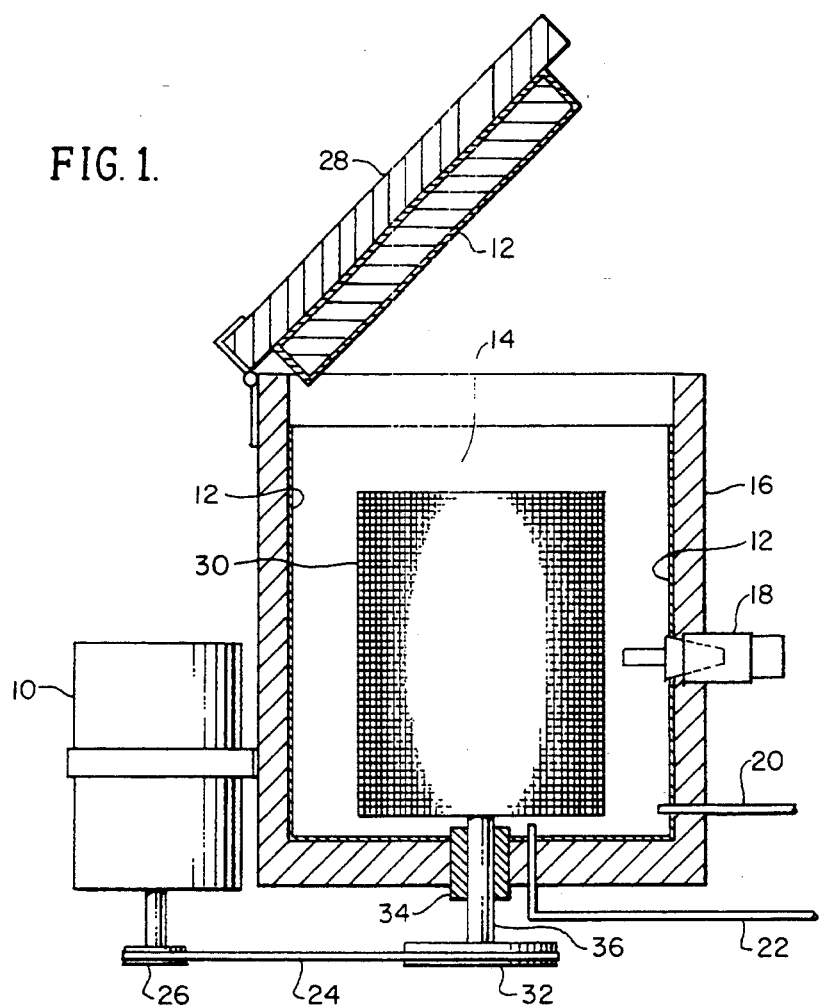
FIG. 1.
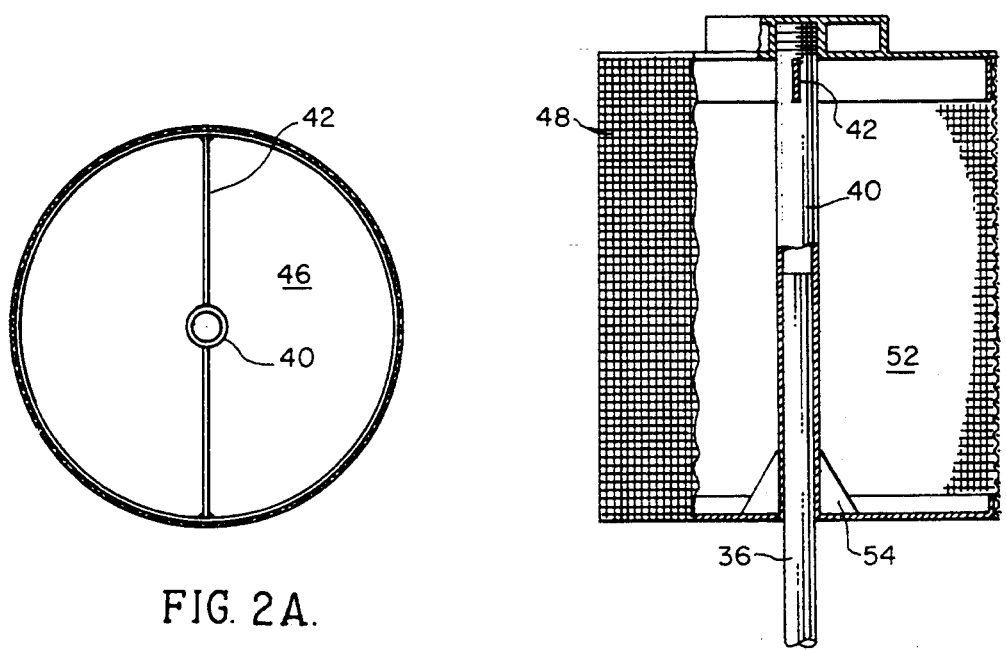
FIG. 2A.
FIG. 2B.

DENSE FLUID MICROWAVE CENTRIFUGE

BACKGROUND OF THE INVENTION

1. Field of the Invention

The present invention relates to an apparatus to be used with liquified and supercritical gases, hereafter described as dense fluids, for cleaning substrates. More particularly, the present invention relates to an apparatus that uses microwave energy in combination with dense fluids or dense fluid solvent mixtures and a variable speed centrifuge to simultaneously clean a variety of inorganic and organic substrates, including biomaterials and hazardous wastes, to prepare said substrates for use in biological, high energy, high vacuum, high temperature, or high pressure systems and applications or, in the application of cleaning (decontaminating) hazardous wastes, to prepare said substrates for reuse or for safe disposal. More specifically, the apparatus of the present invention is designed to clean substrates using the processes of a patent-pending process application Ser. No. 07-915,321, developed by the present inventor, to remove one or more contaminants from a substrate to produce a clean substrate exhibiting improved chemical or physical properties such as increased visual cleanliness, improved electrical insulation, lower thermal outgassing, or biological cleanliness (sterility), among other improved characteristics. In addition, the apparatus of the present invention is useful for detoxifying hazardous materials such as spent activated carbon or to enhance conventional supercritical fluid extraction processes such as the extraction of scents and oils from botanicals.

2. Description of Related Art

Conventional substrate cleaning processes and associated equipment using hazardous organic solvents, toxic gases, radiation, and topical biocides are currently being re-evaluated due to problems with environmental pollution, toxicity, inefficiency, or poor performance. The use of toxic, carcinogenic, or mutagenic substances and associated devices to achieve sterility have been shown to be deleterious to the environment, pose significant health threats (D. Lynch, et al, "Effects on Monkeys and Rats of Long-Term Inhalation of Ethylene Oxide: Major Findings of the NIOSH Study", AAMI, 1984), require strict control, and create hazardous waste disposal problems. Also, conventional cleaning processes may damage or alter substrate performance properties. For example, steam autoclave may greatly accelerate oxide growth on titanium biomaterials (J. Lausmaa, et al, "Accelerated Oxide Growth on Titanium Implants During Autoclaving caused by Fluorine Contamination", BIOMATERIALS, Volume 6, January 1985) and must be carefully controlled.

In some cases, the cleaning media used in conventional devices may chemically react with interstitial substrate residues to form harmful by-products. For example, toxic by-products or residual media left on biomedical substrates following conventional cleaning processes using ethylene oxide gas sterilizers have been shown to adversely impact implant performance (H. Scherer, et al, "Hazards Related to Gas Sterilized Materials, LARYING, RHINOL, OTOL., 65, 1986).

Additionally, conventional biomaterial substrate preparation processes require a separate pre-cleaning operation utilizing still another conventional cleaning device prior to sterilization operations to assure complete substrate sterility. For example, an ultraviolet (UV) disinfection device is used to expose biological contaminants to lethal UV radiation. However, 'shadowing' substrate structures, cavities, or other contaminants impede the effectiveness of this conventional cleaning device and this is a concern (R. Boylan, et al, "Evaluation of an Ultraviolet Disinfection Unit", THE JOURNAL OF PROSTHETIC DENTISTRY, Volume 58, Number 5, November 1987). Since ultraviolet treatment is generally only effective on line-of-sight substrate UV sterilization applications, complex substrates with intricate geometries must be scrupulously cleaned using still another conventional cleaning process prior to placing substrates in a UV sterilization cabinet.

Finally, separate conventional cleaning processes and associated devices are often required to clean substrates. This may involve the immersion of, or the application of topical sterilants, disinfectants, and other chemical agents using swabs or immersion tanks. For example, several physical and chemical sterilization devices and methods are used in industry. These methods include gamma radiation treatment units (Ch. Baquey, et al, "Radiosterilization of Albuminated Polyester Prostheses", BIOMATERIALS, Volume May 8, 1987), ultraviolet radiation cabinets, steam autoclaves, dry heat cabinets, and toxic gas sterilization cabinets (MICROBIOLOGY, M. Peczar, et al, McGraw-Hill Publishers, 1977, pp 425–423).

Substrates used for biomedical, aerospace, high energy, and high vacuum applications are fabricated from different types of materials having various internal and external geometries. These may be assembled biomedical devices such as medical implants, valves, or artificial joints, or they may be surgical aids such as sponges, tubing, guidewires, and clips, and may be contaminated with more than one type of inorganic, organic, or biological contaminant. These highly complex substrates require precision cleaning prior to use in critical environments such as the human body. Often, assembled devices must be disassembled to accommodate conventional cleaning processes and devices.

Polymeric substrates used in surgical applications, or biomaterials, must be free of organic and inorganic residues and microbiological contaminants to provide maximum biologic adhesiveness (cellular adhesion) and no biologic reactivity (biocompatibility). These substrates must be capable of performing their intended function over prolonged periods in contact with living tissue and body fluids. This is a highly specialized environment of great biochemical complexity. The principle medical uses of polymers include: structural materials, joint replacements, dental materials, medical devices (including tubing for transport of biofluids both inside and outside biological systems), adhesives, and sutures. Residual moisture, monomers, oils, plasticizers, dyes, pigments, and other additives contained on or in unclean substrates can produce harmful side effects such as toxic chemical release through bioreaction, infection, swelling, or complete implant rejection.

Substrates having polymeric composition such as spacecraft electrical wiring, electronic connectors, and gasketing must meet stringent NASA outgassing performance requirements ("Vacuum Stability Requirements of Polymeric Materials for Spacecraft Application", SP-R-0022A). Interstitial contaminants such as moisture, plasticizers, and oils, if not removed, volatilize under conditions of high vacuum or high temperature. These contaminants migrate from substrate cavities and deposit on adjacent surfaces, causing system functional problems such as dielectric loss, changes in optical transmission or reflection characteristics, and thermal transfer changes, among others.

Because conventional substrate cleaning processes are performed as independent steps with several cleaning devices required, often the cleaning procedure and devices re-contaminate the substrate with residue or adversely affect the physical properties and subsequent performance of the bulk substrate (J. Doundoulakis, D.M.D., "Surface Analysis of Titanium after Sterilization Role in Implant-Tissue Interface and Bioadhesion", *THE JOURNAL OF PROSTHETIC DENTISTRY*, Volume 58, Number 4, October 1987).

Additionally, conventional sterilization devices only deactivate biological contaminants and do not remove these deactivated residues from the substrate. These residues have been shown to adversely affect the performance of biomaterials following implant operations.

Additionally, conventional cleaning devices are effective only on external surfaces of composite or intricately arranged substrates and provide little or no internal cleaning and sterilization capability. In implant cleaning applications, it is imperative that both external and internal surfaces of substrates be both chemically and biologically clean.

Conventional substrate cleaning devices employ hazardous organic cleaning solvent such as isopropyl alcohol (Hohmann et al, "Method and Apparatus for Cleaning, Disinfecting and Sterilizing Medical Instruments" U.S. Pat. No. 4,710,233, Dec. 1, 1987), chlorinated hydrocarbons, and other toxic and flammable compounds. Also, many conventional cleaning devices employ agents that are generally not chemically compatible with organic materials such as spices and herbs, only clean external surfaces, and do not provide a means of extending the cleanliness of the material once following processing. Additionally, this referenced patent and its device do not provide for the removal of residual sterilizing agents from substrates.

In another example of known art using supercritical fluids as washing agents (Nishikawa et al, "Method of Processing an Article in a Supercritical Atmosphere", U.S. Pat. No. 4,944,837, Jul. 31, 1990), a substrate is cleaned in a supercritical atmosphere using a pressure cleaning device to prepare the material for resist stripping using a supercritical fluid or an admixture solvent. Our research shows that non-energized mono-phasic supercritical fluids, such as those employed by this device, are poor cleaning solvents for many typical contaminant removal or chemical agent implant applications. Firstly, a contaminant or chemical agent must be provided by the proper solvent environment in order to be transported. This may involve employing one or more dense fluids, fluid states (liquid and supercritical) and chemical agent admixtures which is based upon knowledge of the solubility chemistries of the targeted contaminants or the chemical agents. Secondly, our research shows that adjunct higher energy is required to efficiently and effectively solubilize and transport contaminants from substrates, not provided for in this patent citation. Finally, this patent and its devices do not provide a means of altering the chemical or physical characteristics of the bulk substrates, more specifically, the contaminants contained within said substrates, for utilization in critical environments where different bulk properties (internal and external characteristics) such as long-term sterility, improved ductility, or improved electrical insulation would be desirable or required.

Examples of known art (developed by the inventor of the processes of the present invention) using phase shifting of dense fluids (Jackson et al, "Cleaning Process Using Phase Shifting of Dense Phase Gases", U.S. Pat. No. 5,013,366, May 7, 1991) and photochemical action on dense fluids (Jackson, "Dense Phase Gas Photochemical Process for Substrate Treatment", U.S. Pat. No. 5,068,040, Nov. 26, 1991), a substrate and its unwanted residues are subjected to dense fluid chemistries that have been phase shifted via temperature (or pressure), or altered photochemically, to create the most suitable solvent environments (like-dissolves-like) for various contaminants in substrates. Devices associated with these processes employ ultrasonic energy, temperature and pressure control, and ultraviolet light singularly or in combination to simultaneously remove one or more contaminants from a substrate. These processes are based upon the action of externally applied energy (heat, fluid pressure, light, and sound energy) on the dense fluid to alter the dense fluid chemistry to effect separation of surface or subsurface contaminants from a substrate. Our research reveals that mechanisms and devices used to perform cleaning operations cited in these patents are not generally effective or efficient when processing bulk materials having different geometries such as connector pins and gaskets. The apparatus of the present invention provides superior methods for decontaminating substrates having various geometries by activating the unwanted contaminants deep within the substrate to facilitate transfer into the surrounding dense fluid environment and separation from the bulk substrate. The apparatus of the present invention is unique in that the applied energy source, microwave radiation, selectively activates surface and interstitial contaminants contained on or within substrates and only minimally interacts with the substrate (solid state) and dense cleaning fluids, including carbon dioxide and xenon (non-polar fluids). Alternatively, polar dense fluid mixtures consisting of, for example, 98% (by volume) liquified carbon dioxide and 2% (by volume) purified water or n-octyl alcohol may be used in conjunction with microwave energy. Microwave energy will be absorbed by the polar component of the dense fluid mixture, enhancing contaminant-removal or biocidal efficiency (n-octyl alcohol or hydrogen peroxide as biocides) in cleaning applications. Thus the apparatus of the present invention can be used to activate the contaminants, the dense cleaning fluid(s), or both.

Finally, previously described devices using dense fluids as cleaning agents does not address the mechanical energy required to efficiently and effectively remove organic, inorganic, and biological contaminants from substrates. For example, mechanical agitation is mandatory in order to loosen and remove tenacious contaminants such as an oily particle matrix. This is particularly important in cleaning applications where bulk substrates are being processed, for example, hundreds of thousands of oily connector pins having various lengths and dead-end holes having entrapped particles and oils. In the known art related to the present invention, dense fluids or dense fluid mixtures are contacted with substrates. These processes employ devices which only provide for contact of said dense fluids with a substrate and solubilization of a contaminant. These processes and associated devices are very inefficient because of the limited solute carrying capacity of dense fluids, due in part, to their low viscosity and density. This is particularly true with regards to cleaning bulk materials. To effectively clean bulk substrates such as ground or powdered botanicals, connector pins, machined parts, or other assemblies, the substrates must be evenly exposed to the dense fluid or dense fluid mixtures and energy sources.

The apparatus of the present invention uses a unique variable-speed basket centrifuge cleaning apparatus that provides the following cleaning enhancements; 1) homogenizes the dense fluid cleaning solvent and 2) uniformly exposure of the substrates to microwave energy and 3) provides centrifugal force to separate said contaminants from substrates and 4) provides multi-phase cleaning. Thus, the contaminated substrates are homogeneously mixed and contacted with the dense fluid cleaning agents and cleaning energies while simultaneously being exposed to microwave and centrifugal energies.

Accordingly, there is a present need to provide an efficient and safe cleaning device having broader substrate cleaning capabilities and which is designed for use in removing more than one type of contaminant from a variety substrates having complex geometries, densities, and volume.

SUMMARY OF THE INVENTION

The present invention provides a cleaning apparatus for cleaning substrates to enhance both chemical and physical properties of said substrates for use in critical environments such as the food industry, space, aerospace, manufacturing, biomedical, high energy, or high vacuum. The apparatus of the present invention provides electromechanical energy systems for cleaning complex substrates such as composites and assemblies having various materials of construction and with intricate internal and external geometries (3-dimensional and large quantity). Substrates may be prepackaged in semi-permeable membranes, cleaned using the apparatus of the present invention, thus providing long-term protection.

Compared to conventional substrate cleaning devices, this invention offers advantages such as broader substrate cleaning application, significant cleaning performance effectiveness and cleaning efficiency benefits via an electromagnetic and centrifugal energy combination, and is not dependent upon the bulking characteristics or quantity of substrates being processed. Additionally, the present invention provides an alternative to many conventional cleaning processes including degreasing, outgassing, extraction, sterilization, preservation, and substrate engineering processes, often performed as individual steps.

The above-discussed and many other features and other attendant advantages of the present invention will become better understood by reference to the following detailed description when considered in conjunction with the accompanying drawings.

BRIEF DESCRIPTION OF DRAWINGS

FIG. 1 is a detailed sectional view of the exemplary dense fluid microwave centrifuge cleaning system showing an exemplary internal microwave radiation antenna feedthrough and basket centrifuge.

FIGS. 2A and 2B are top and side sectional views of an exemplary removable centrifuge basket assembly used to contain, homogenize, microwave, and centrifuge substrates.

DETAILED DESCRIPTION OF THE INVENTION

Figure 3:
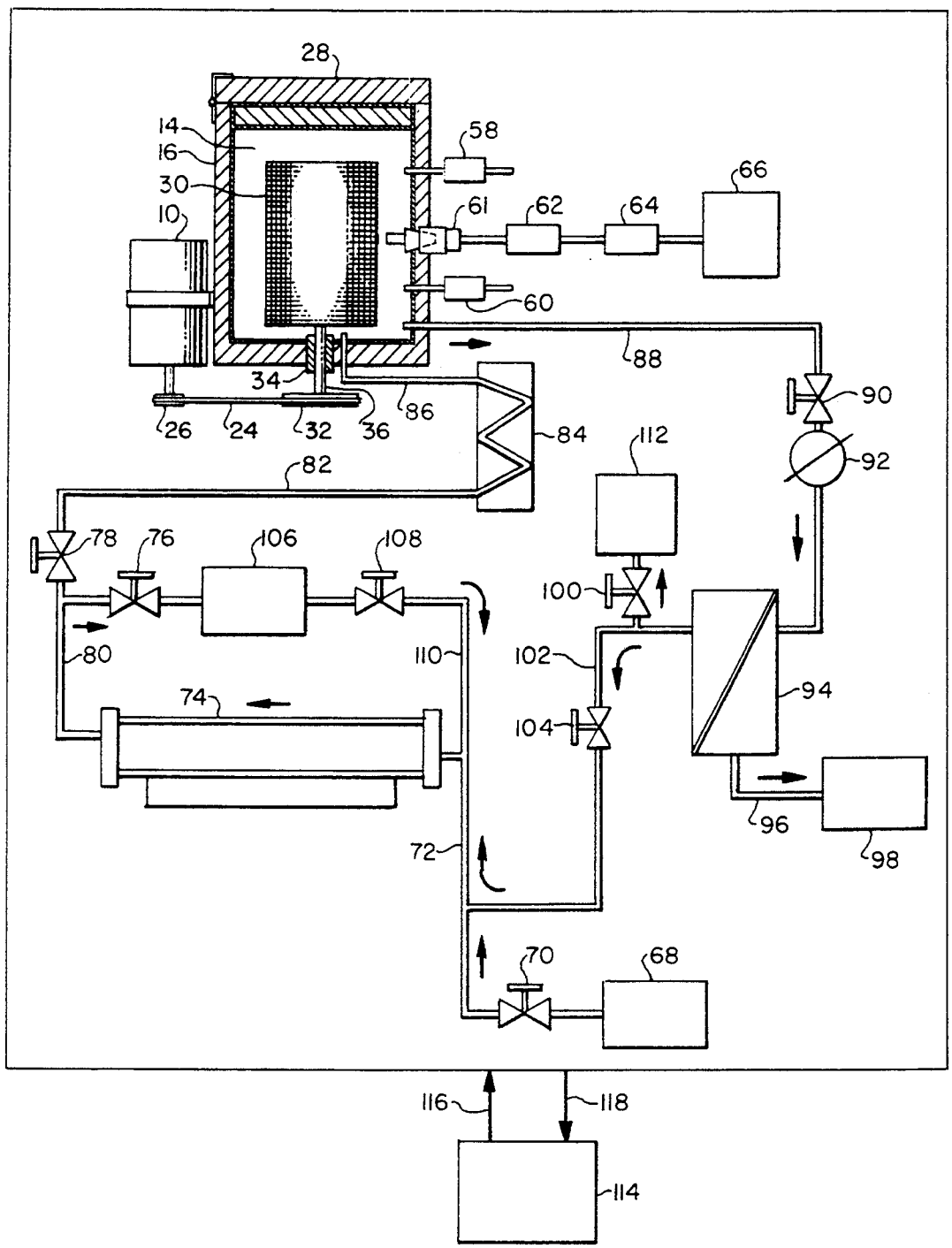
FIG. 3 is a schematic showing the integration of ancillary support systems with the dense fluid microwave centrifuge system.

In a first embodiment of the present invention, a microwave energy device has been engineered to work with this unique device. Microwave radiation for practicing the present invention can be provided by an electronically-tuned tube oscillator or Magnetron. The Magnetron converts electrical energy into electromagnetic radiation and can be adjusted or tuned to a range of radiation wavelengths. An exemplary Magnetron to provide microwave radiation for use with the present invention operates at 2.45 GHz. The microwave generator is coaxially coupled with a power attenuator and tuner which is coupled with a microwave antenna or circular horn that emits the electromagnetic energy into a cleaning chamber containing the substrates with the contaminants to be activated. The internal walls of the cleaning chamber are lined with a microwave-reflective surface such as, in this invention, a thin sheet liner consisting of anodized aluminum. Conventional applications of microwave include communication and therapeutic use (W. Stephen Cheung, "Microwave Principles and Applications", Artech House, 1985). Heating microwave radiation required for practicing the present invention can be produced using a variable power output (100 watts to 600 watts) Magnetron operating at 2.45 GHz, available from a variety of commercial dielectric heating system suppliers, which is transmitted into the cleaning chamber through a quartz window or through a coaxial antenna feedthrough. The power requirements for the microwave unit are based on the size of the cleaning chamber and desired energy output.

In a second embodiment of the present invention, centrifugal energy is used in conjunction with cleaning processes of the present invention to further enhance cleaning by physically separating contaminated dense fluids contained in or on substrates from said substrates. Contaminants and contaminated dense fluids will separate according to density differences under the influence of centrifugal forces. Substrates contained at the center of the cleaning chamber remain stationary while mobile contaminants and contaminated dense fluids are forced outward during centrifugation toward the cleaning chamber walls. Centrifugal energy is accomplished in the present invention utilizing an internal cleaning chamber basket centrifuge operating at variable rotational speeds of between 10 and 800 revolutions per minute (11 to 880 times the force of gravity). Lower rotational speeds provide a means of mixing bulk substrates where mixing rather than centrifugal separation is more desirable. Higher rotational speeds, hence higher centrifugal force, are employed where high contaminant-substrate separation efficiency is required. Thusly, centrifugation provides for mixing and separation of substrates, contaminants, dense fluids, and dense fluid admixtures.

The microwave and centrifugal forces used in the present invention work cooperatively to extract and separate contaminants from the substrate interstices. Additionally, depending upon the orientation of the cleaning chamber and basket centrifuge; vertical or horizontal, different mixing qualities are achieved. For example, a horizontal operating configuration allows substrates to tumble, and depending upon cleaning chamber temperature gradients present, allows substrates to contact subcritical dense fluid (lower half of cleaning chamber) and supercritical fluid (upper half of cleaning chamber) during each rotation.

In a third embodiment of the present invention, microwave radiation and centrifugal force are applied to substrates under negative pressure (vacuum) of approximately $1 \times 10^{-4}$ Torr following dense fluid cleaning processes. Substrates are centrifuged and pulse-irradiated as described in the above embodiments under conditions of vacuum is further enhance removal of residual volatile and non-volatile contaminants. A vacuum is produced in the present invention using a high vacuum pump that is integrated with the cleaning chamber.

The necessary processing parameters: gas type, gas mixture ratios, microwave energy intensity, centrifuge speed, temperature and pressure, and exposure durations to achieve the desired cleanliness levels are dependent upon the nature and extent of contamination, the substrate configuration, and the quantity and volume of substrates being processed. With the aid of process computerization, these processing parameters are correlated with factors such as substrate composition to provide a processing library to assist the development of new substrate engineering applications and to provide consistent substrate processing. As an alternative to indirect performance testing as described above, direct in-line chemical analysis techniques such as supercritical fluid chromatography (SFC) may be used to examine dense fluid extracts from the cleaning device as an indicator of cleaning device performance.

The operation of this invention will be best understood by reference to the following detailed discussion of the cleaning system components and system integration. A detailed discussion of the exemplary processing sequence using the cleaning apparatus will follow.

FIG. 1 is a detailed diagram of a dense phase gas microwave centrifuge cleaning device. As shown in FIG. 1, the device includes a cleaning chamber 16 and hinged chamber closure 28, which can be hydraulically opened and closed, with an internal non-conductive (microwave reflecting) inner chamber wall liner 12, shown with mating liner closure affixed to the exemplary chamber closure 28, providing a total microwave-reflecting inner cleaning chamber 14 the closure 28 is in the closed and sealed position (not shown). The interior liner and liner cover can be constructed out of anodized aluminum to provide the microwave-reflecting surfaces required to operate the microwave unit of this invention. A basket centrifuge assembly to be used in accordance with the present invention consists of a variable speed motor 10 connected to a pressure-sealing centrifuge shaft feedthrough 34 and rotating shaft 36. The centrifuge shaft 36 is connected to a pulley 32 which is connected to a motor pulley 26 via a centrifuge motor drive belt 24, which provides for rotation of the centrifuge shaft. A centrifuge basket 30, used to contain substrates, is contained in the cleaning chamber interior 14 and is connected to the centrifuge shaft 36 and feedthrough assembly 34. The centrifuge basket slides over a centrifuge shaft 36, contained within the cleaning chamber, and is secured using a suitable locking device (not shown). The exemplary cleaning chamber 16 is equipped with a coaxial microwave feedthrough 18 or a cylindrical or rectangular quartz window (not shown), and extends through the chamber wall 16 through the inner chamber liner 12 and is used for introducing microwave radiation into the cleaning chamber 14. The cleaning chamber is equipped with an inlet dense fluid feed pipe 22 located near the center of the cleaning chamber and a contaminated dense fluid exhaust pipe 20 located on the outer cleaning chamber wall 16. External cooling glands (not shown) are affixed to the lower hemisphere of the substrate cleaning chamber 16 and heating glands (not shown) are affixed to the upper hemisphere of the substrate cleaning chamber 16, both using an array of thermoelectric coolers and heaters. These temperature control systems are used in a horizontal-orientation basket centrifuge configuration, as depicted in FIG. 1, to maintain a chamber wall temperature gradient from above the critical temperature (upper chamber hemisphere) to below the critical temperature (lower cleaning chamber hemisphere), similar to a vapor degreaser, during cleaning operations.

FIG. 2A and FIG. 2B are partial sectional views of an exemplary centrifuge basket assembly for loading, securing, tumbling or barreling or centrifuging, and unloading substrates in the dense fluid microwave centrifuge cleaning system discussed above. As shown in FIG. 2A (Top View), the exemplary basket includes an opening 46 to accommodate substrates and a structural support 42 to minimize basket wobble during high speed centrifugation. Also shown in this top view is a cylindrical sleeve 40 which slides down the internal centrifuge shaft (not shown) to allow the basket to be easily inserted or removed from the cleaning chamber (not shown). The exemplary basket shown in FIG. 2B (Side View), shows lower sleeve supports 54 which provide additional stability at high rotation speeds. FIG. 2B shows the basket 50 sliding over the internal centrifuge shaft 56. Centrifuge basket components are designed to be non-obstructive and non-absorbing of the microwave energy and are meshed so that dense fluids flow 52 into and out of the basket to contact the substrates. The centrifuge shaft 56 is affixed to a feedthrough shaft in the exemplary cleaning chamber (not shown) and motor as described above. It should be noted that many other centrifuge basket configurations can be developed to accommodate substrates having different geometric configurations. Baskets must be constructed out of materials which are chemically and physically compatible with the dense fluids, dense fluid-chemical agent admixtures, pressures, temperatures, high rotational forces, and high energy conditions present in this invention. The basket body 48 shown in FIG. 2B is constructed of composite materials and is meshed to allow for dense fluid flow, un-attenuated penetration of microwave energy, and containment and mixing of substrates.

An exemplary support system, including computerization and major component integration, required for operating the present invention is shown diagrammatically in FIG. 3. As shown FIG. 3, the exemplary cleaning unit system for use in operating the present invention includes, at a minimum, a temperature sensor 58 and pressure sensor 60 affixed to the cleaning chamber. The coaxial microwave antenna feedthrough 61 affixed to the cleaning chamber or quartz window feedthrough, as discussed above, is connected to a microwave tuner 62, power controller 64, and microwave generator 66. A gas supply 68 consisting of one or more of the preferred gases and a gas preconditioning system (not shown) used for removing trace contaminants in the gas supply feeds a high pressure pump 74 via a valve 70 and connecting pipe 72. A connecting pipe 80 and valve 78 feed dense fluid from the pump 74 to a heat exchanger 84 via connecting pipe 82. A connecting pipe 86 feeds cooled dense fluid into the center of the cleaning chamber as depicted in FIG. 3. A connecting pipe 88 and valve 90 feed dense fluid containing contaminants from the outer chamber walls of the cleaning chamber, as depicted in FIG. 3, through a pressure regulator 92 to a separation and recovery filter 94. Separated contaminants are fed via a connecting pipe 96 to a collection receiver 98. Cleaned dense fluid is fed via a connecting pipe 102 and valve 104 back to the pump 74 via connecting pipe 72. A connecting pipe 80 feeds reclaimed dense fluid via a valve 76 into a collection receiver 106 for subsequent reuse. Reclaimed dense fluid is fed via connecting pipe 110 and valve 108 to the pump 74. A high vacuum pump 112 is connected to the separation and recovery filter 94 via valve 100 for microwave-energized vacuum decontamination operations. Finally, the exemplary cleaning support system with its network of valves, sensors, pumps, and high energy systems (microwave and basket centrifuge assembly) are integrated with a computer control system 114 using analog inputs 118 and digital control outputs 116 in combination with computer control software. Dense fluid energy calculations and substrate processing parameters in relation to the specific substrate end-product performance requirements are correlated and stored in computer software libraries to provide detailed and consistent material processing and serve as a reference database for new substrate engineering applications.

Finally, the exemplary cleaning support system as described above would preferably be housed and operated in an environmental control enclosure (not shown) to prevent re-contamination of biomedical substrates cleaned according to this invention.

Having thus discussed the exemplary cleaning system components necessary for practicing the various embodiments of the present invention, the following is a detailed discussion of an exemplary cleaning sequence using the present invention.

Figure 4:
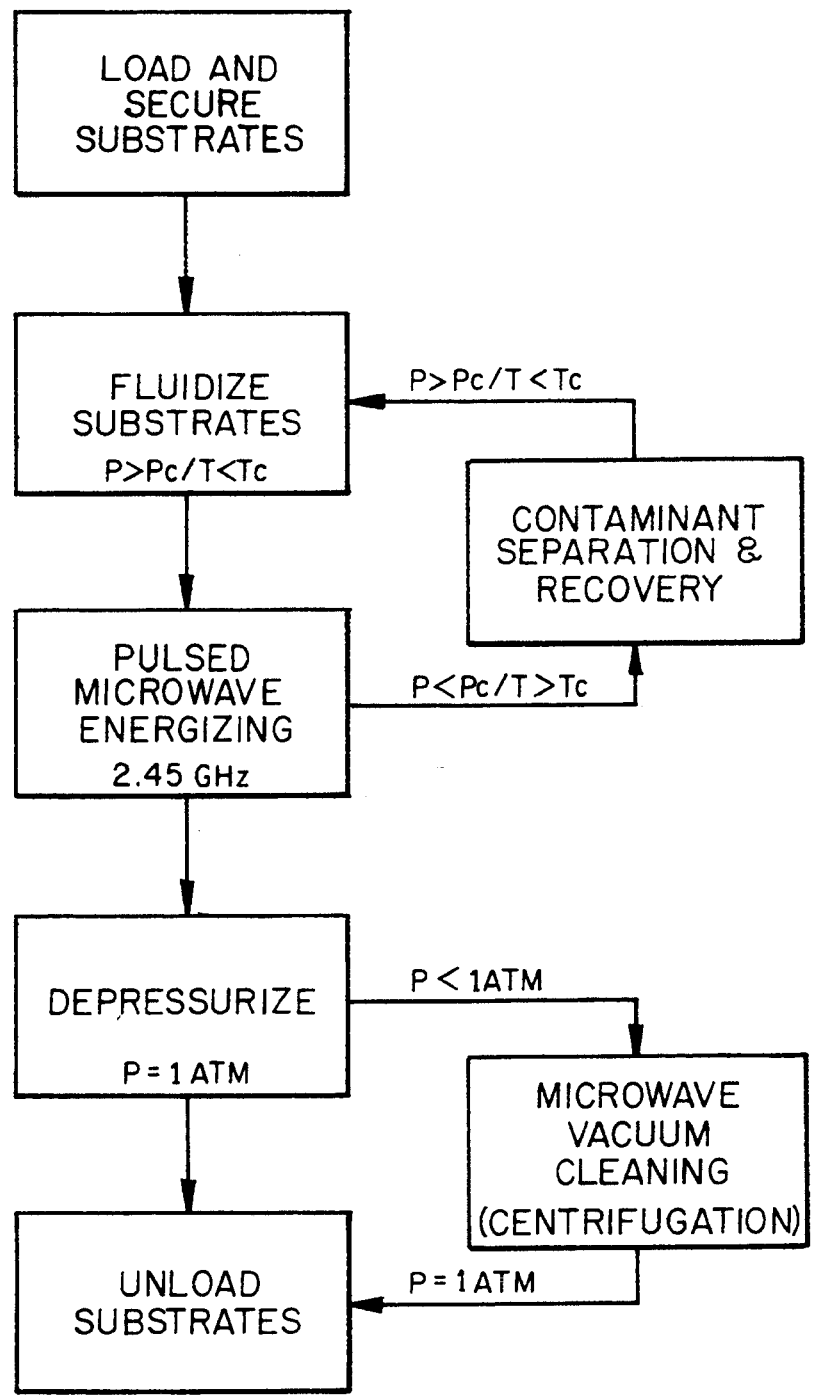
FIG. 4 is a flowchart setting forth an exemplary cleaning process sequence for the dense fluid microwave centrifuge system, including a microwave-vacuum cleaning sequence.

A flowchart showing the sequences employing the microwave centrifuge cleaning apparatus is shown in FIG. 4. The process is carried out in the substrate cleaning chamber 16, FIG. 1, which contains the substrates to be processed secured in the exemplary centrifuge basket 30, FIG. 1. As shown in FIG. 1 and referring to FIG. 3, substrates are first loaded and secured in the exemplary substrate cleaning chamber using the exemplary centrifuge basket, whereupon the chamber is sealed using the chamber closure and purged for several minutes with carbon dioxide. This is accomplished by opening the gas supply feed valve 70, chamber feed valve 78, chamber exhaust valve 90, and vacuum/release valve 112, whereupon the gas purges the cleaning chamber via connecting pipe 72, connecting pipe 80, connecting pipe 82, and connecting pipe 86, and exhaust from the cleaning chamber via connecting pipe 88. This is performed for 2 to 3 minutes at a pressure of approximately 100 atms using the pressure/recirculation pump 74. Gas purging removes volatile impurities such as moisture in the chamber and pre-conditions the substrates prior to pressurization to the operating pressures at or above the critical pressure for the selected processing gas or gas mixture. Following purging cycles, the cleaning chamber is pressurized to a pressure equal to or greater than the critical pressure of the selected dense phase gas (i.e., carbon dioxide) supply 68, or reclaimed gas supply 106 using the pressure pump 74 and connecting pipes indicated in FIG. 3, at a temperature below the critical temperature of the dense gas or gas mixture. At this point, the substrates are bathed in dense fluid (fluidization). The substrates are then simultaneously subjected to the pulsed microwave energy cycles by turning on the microwave generator 66 for a predetermined period of time and then turning it off for a predetermined period of time. Centrifugal force, as described in this invention, is applied continuously during fluidization and microwave energizing operations. Centrifugal force is created by spinning the basket 30, FIG. 1, at high rotational velocities by turning on the motor 10, FIG. 1, which in turn rotates the centrifuge basket using a system of pulley, belt drive, and feedthrough shaft as discussed above. During microwave and centrifugal operations, the internal substrate cleaning chamber fluid temperature is held below the critical temperature, measured using temperature sensor 58, and at the pressures indicated in FIG. 8, measured using pressure sensor 60, by continuously removing centrifuged dense fluid, containing contaminants removed from substrates, from the cleaning chamber interior via exhaust pipe 88 and valve 90 through the separation filter 94 and returning the filtered dense fluid, via the high pressure pump 74, associated connecting pipes, and heat exchanger 84, back into the cleaning chamber. The contaminated dense fluid is delivered to a separation and recovery filter 94 to separate contaminants from the dense fluid by dropping the pressure of the dense fluid to below the critical pressure using the regulator 92. The contaminants, for example machining oils, are recovered from the separation and recovery filter 94 and captured in a receiver 98 via connecting pipe 96 for reuse or recycling. The cleaning sequence using the present invention is repeated as required to attain the desired substrate cleanliness level, based on predetermined performance testing or based upon data from in-line cleaning chamber dense fluid testing such as supercritical gas chromatography. Following the microwave-centrifugal cleaning sequence, the cleaning chamber is depressurized to ambient pressure (1 atm) by turning on a vacuum pump 112 connected to the cleaning chamber via valve 100 and connecting pipe 88 and the cleaning chamber is depressurized to approximately 0.0001 Torr. Pulsed microwave energy and centrifugal force are applied as discussed above to facilitate removal of residual volatile contaminants under vacuum for several minutes.

Examples of use of the present invention are as follows.

EXAMPLE 1

This example illustrates the present invention to remove cutting oils from machined connector pins. Machined connector pins are contaminated with oils and machining soils which must be removed prior to subsequent electroplating operations. Liquified carbon dioxide is used in combination with electromagnetic and centrifugal energy cycles to precision clean and dry the connector pins. The dirty pins were loaded and secured in the cleaning chamber using the centrifuge basket assembly and purged with preconditioned carbon dioxide gas at 10 atm for several minutes. Following gas purging, the chamber was pressurized with carbon dioxide to 150 atm at approximately 25 degrees celsius. The centrifuge basket assembly was activated and rotated at a rate of 500 revolutions per minute causing the pins to centrifuge in the liquified gas solvent. The pins were allowed to contact the dense phase carbon dioxide in this manner for several minutes, during which microwave energy was pulsed at approximately 250 watts at 2.45 GHz over 10 second-on and 60 second-off intervals. During this operation, the dense fluid was continuously removed from the cleaning chamber, filtered to separate and recover machining oils (contaminants) removed from the pins, and returned to the cleaning chamber. The temperature of the dense phase carbon dioxide was held relatively constant, but always below the critical temperature. This entire process was continued for approximately 15 minutes. Following microwave centrifuge cleaning, the cleaning chamber was depressurized to ambient, the basket centrifuge was stopped, and the clean pins were removed from the cleaning chamber. The pins were visibly clean and showed no hydrocarbon contaminants. The oils recovered from the cleaning operation during continuous dense fluid recycling and contaminant separation processes were recovered and reused in subsequent pin machining processes.

EXAMPLE 2

This example illustrates the use of the cleaning processes of the present invention to clean titanium clips prepackaged in TYVEK semi-permeable membranes for use in attaching bone and tissue in surgical applications. A precision cleaning sequence identical to the process carried out in example 1 with a 2% v:v loading of hydrogen peroxide resulted in visibly clean titanium clips and a negative bacterial count based on results of a standard microbiological culturing test.

EXAMPLE 3

This example illustrates the use of cleaning processes of the present invention to decontaminate 1,1,1-trichloroethane contaminated textiles used to wipe down aerospace parts and equipment. In accordance with the cleaning processes of the present invention, a dense phase gas mixture consisting of 90%:10% by volume of carbon dioxide and nitrous oxide respectively was centrifuged and microwaved in several cycles at 150 atm and 34 celsius. The critical temperature for nitrous oxide is approximately 37 degrees celsius and 32 degrees celsius for carbon dioxide, therefore the contaminated textiles were centrifuged in a two-phase dense fluid cleaning mixture at approximately 500 rpm, whereupon the dense fluid cleaning mixture was continuously removed and recycled as in example 1. Following processing, the processed textiles were odor-free, dry, and reusable. The recovered solvent was reclaimable.

EXAMPLE 4

This example illustrates the use of cleaning processes of the present invention to prepare a silicone voice prosthesis for bioimplant utilization. A silicone voice prostheses was cleaned in a procedure identical to example 2 except that this cleaning sequence used a 95:5 by volume carbon dioxide/n-octyl alcohol mixture. Following cleaning process, the cleaning chamber was depressurized to $1 \times 10^{-4}$ torr and microwave energized to maintain an internal cleaning chamber temperature of approximately 60 degrees celsius for 60 minutes to remove n-octyl alcohol and other volatile residues from the prepackaged prosthesis. As in example 2, the centrifuge remained on during all phases of the cleaning sequence. Microbiological culturing tests on representative portions of the silicone prosthesis revealed no biological activity several weeks following the implant process.

EXAMPLE 5

This example illustrates the use of the cleaning process of the present invention to clean elastomeric compounds for use in high energy environments where substrate thermal outgassing or dielectric properties require significant performance improvement when compared to the original substrate (unclean) performance characteristics. A microwave centrifuge cleaning process identical to example 1 except that a 90:10 v:v mixture of liquid carbon dioxide and liquid nitrous oxide were used to clean fluorosilicone-based interfacial seals used in connection devices. Following this, microwave-energized vacuum extraction processes were used as in example 4 and in accordance with the present invention to remove residual volatile materials. The cleaning chamber was then repressurized to ambient. The cleaned elastomers exhibited superior total mass loss and dielectric properties compared to the original unclean elastomers.

The processes of the present invention have numerous substrate cleaning applications. Compared to closest known art, this invention provides superior performance and substrate cleaning application. A wide variety of substrates can be prepared for biomedical, aerospace, and high energy environments where substrate cleanliness and end-product performance characteristics are a concern. Substrates include biomaterials, prostheses, precision and miniature valves, surgical textiles, surgical application aids, contaminated textiles, hazardous solid wastes, and botanical products, among others. The particular processing parameters employed using the processes herein will vary depending upon the nature of the substrate, the type of contaminants to be removed, and level and type of cleanliness desired. This process is well suited to preparing substrates having complex and intricate internal and external geometries, having many different construction materials, and bulk quantity.

Having thus described exemplary embodiments of the present invention, it should be noted by those skilled in the art that the within disclosures are exemplary only and that various other alternatives, adaptations, or modifications may be made within the scope of the present invention. Accordingly, the present invention is not limited to the specific embodiments as illustrated herein, but is only limited by the following claims.

What is claimed is:

1. A device for cleaning a substrate containing at least one contaminant by placing the substrate in a centrifuge basket in a cleaning chamber comprising the combination of:
   a) a cleaning chamber for contacting said substrate containing said contaminant with a dense fluid at a pressure equal to or above the critical pressure and below the critical temperature of a said dense fluid;
   b) a variable speed centrifuge basket assembly within said chamber holding said substrate;
   c) a source of microwave energy operating at a frequency of 2.45 GHz impinging against said substrate;
   d) a vacuum pump to remove residual contaminants or excess chemical cleaning or physical agents from said chamber in between processing stages of cleaning.

2. The device as set forth in claim 1 wherein:

said source of microwave energy generating a microwave energy field and comprises a combination of a microwave generator, microwave tuner, and microwave emitting antenna.

3. The device as set forth in claim 2 wherein:

said microwave energy field is transferred into said cleaning chamber having a wall and with a microwave emitter coupled with a quartz window feedthrough in said cleaning chamber wall having a microwave-reflective inner liner.

4. The device as set forth in claim 2 wherein:

said microwave energy field is transferred into said cleaning chamber by a microwave emitter coupled with a coaxial feedthrough affixed to said cleaning chamber wall.

5. The device as set forth in claim 2 wherein:

said source applying said microwave energy field at 2.45 gigahertz.

6. The device as set forth in claim 2 wherein said source generating said microwave energy field applied between 100 and 1000 watts of energy.

7. The device as set forth in claim 2 wherein:

means included on said source of said microwave energy for applying said microwave energy pulsed or continuously.

8. The device as set forth in claim 2 wherein:

means for applying said microwave energy field is applied under pressure of less than 1 atm (vacuum).

9. The device as set forth in claim 1 wherein:

means for pressurizing said dense fluids to greater than or equal to critical pressure.

10. The device as set forth in claim 1 wherein:

said chamber holding a quantity of dense fluid selected from the group which consists of carbon dioxide, nitrous oxide, water, krypton, and argon.

11. The device as set forth in claim 1 wherein:

said basket is constructed from polypropylene, teflon, or anodized aluminum.

12. The device as set forth in claim 1 wherein:

said basket is constructed of materials that do not absorb microwave radiation.

* * * * *